United States Patent
Allen

[15] 3,695,579
[45] Oct. 3, 1972

[54] VALVE
[72] Inventor: Herbert Allen, P.O. Box 1212, Houston, Tex. 77001
[22] Filed: June 1, 1971
[21] Appl. No.: 148,698

[52] U.S. Cl. ............251/174, 137/330, 251/317
[51] Int. Cl. ............................................F16k 5/06
[58] Field of Search ............137/330; 251/174, 317

[56] References Cited

UNITED STATES PATENTS

| | | |
|---|---|---|
| 3,235,272 | 2/1966 | Smith............251/214 X |
| 3,255,769 | 8/1966 | Shaud............251/174 X |
| 3,497,178 | 2/1970 | Priese............251/317 X |
| 3,537,680 | 11/1970 | Zajac............251/174 X |
| 3,561,730 | 2/1971 | Hurst............251/174 X |

*Primary Examiner*—Harold W. Weakley
*Attorney*—Hyer, Eickenroht, Thompson and Turner

[57] ABSTRACT

A valve having a bearing ring of low friction material between each seat and the flowway through the valve body. Rings of elastomeric material seal between the bearing ring and each of the seat and flowway.

8 Claims, 7 Drawing Figures

PATENTED OCT 3 1972  3,695,579
SHEET 1 OF 2

Herbert Allen
INVENTOR.

BY Hyer, Eickenroht,
Thompson & Turner
ATTORNEYS

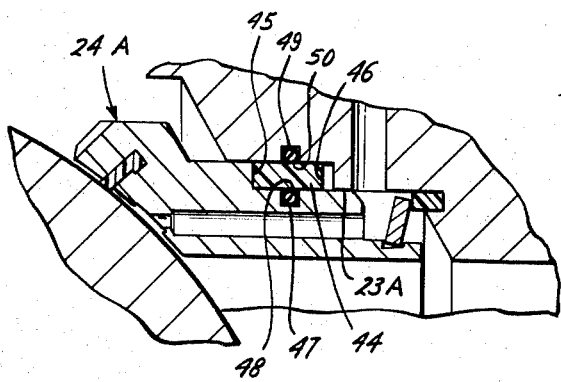
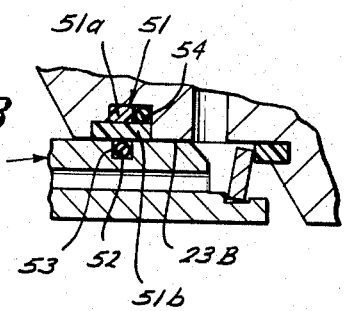
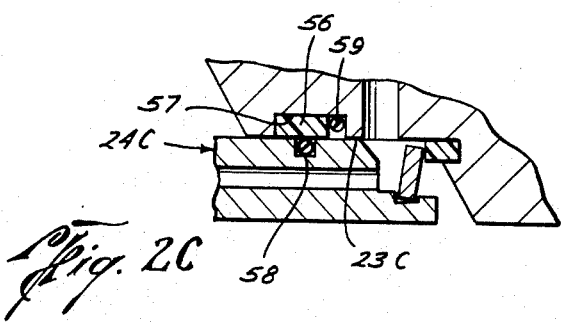
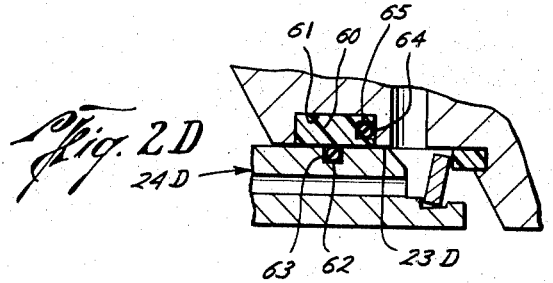
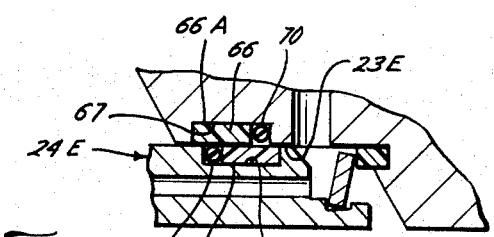

VALVE

This invention relates generally to valves of the type having seats sealably and slidably mounted within the flowway through the valve body for engaging opposite sides of the closure member. In one of its aspects, this invention relates to improvements in valves of this type wherein the seats are subjected to high radial loads, such as those which occur in ball values as well as in ball or other valves in which the seats are caused to rotate about their axes by mechanisms engageable with and exerting a force upon their outer peripheries, as shown for example in U.S. Pat. No. 3,157,190.

Ordinarily, these seats are sealed with respect to the flowway of the valve body by means of one or more conventional rings of rubber or other readily deformable elastomeric material. Although these rings usually provide reliable seals, they have high friction characteristics in contact with metal and thus resist relative sliding between the seat and flowway in an axial direction, as may occur during normal operation of any valve of this type, as, for example, during expansion and contraction of the valve body. When the seats and thus the rings are subjected to the above-mentioned relatively high radial loads, this frictional resistance is materially increased.

For this and other reasons, it has been proposed to seal the seat with respect to the body by rings of polytetrafluoroethylene or other material having low friction characteristics. Although rings of this type provide less resistance to sliding of or on the seals, they do not ordinarily provide as reliable a seal as rubber. Thus, for example, polytetrafluoroethylene will provide a reliable seal only against surfaces having finishes at least as smooth as 16 micro inches. Also, since it is not as readily deformable as rubber and tends to creep or cold set, polytetrafluoroethylene is not as reliable in sealing between surfaces having moderate to large tolerances. When washer type springs are used to urge the inner end of the seat against the closure member, their engagement with both the seat and the valve body adds further to the resistance to sliding between the seat and flowway.

An object of this invention is to provide a valve of this type in which the seat is sealed with respect to the flowway in a reliable manner, and, at the same time, is slidable with respect thereto with a minimum of resistance.

Another object is to provide a valve of the character defined in the foregoing object having a washer type spring for urging the seat against the closure member which incurs a minimum of resistance to sliding of the seat with respect to the flowway.

These and other objects are accomplished, in accordance with the illustrated embodiment of the invention, by a valve of the type above described including a bearing ring disposed between the seat and the flowway and having annular surfaces which fit closely against conforming surfaces on the seat and flowway, and first and second rings sealing between the conforming annular surface on the bearing ring and flowway and on the bearing ring and seat, respectively. The bearing ring is formed of polytetrafluoroethylene or other material having low friction characteristics, and the sealing rings are formed of rubber or other readily deformable elastomeric material. Thus, all sliding of the rubber O-rings will be over the bearing ring which, due to the low friction characteristics of the bearing ring, reduces resistance to sliding of the seat within the flowway. More particularly, the bearing ring is preferable of such thickness and that it reduces metal-to-metal contact between the seat and flowway, so that there is less resistance to sliding of the seat within the flowway, during either axial movement of the seat with respect to the flowway or during rotation of the seat.

A washer type spring has its inner and outer edges engaged with oppositely facing surfaces of the seat and valve body to urge the seat against the closure member, and at least one of the surfaces engaged by the spring is formed of polytetrafluoroethylene or other material having low friction characteristics. Thus, there will be a minimum of drag between them during sliding of the seat within the recess.

In the drawings, wherein like reference characters are used throughout to designate like parts:

FIGS. 2A, 2B, 2C, 2D, and 2E are views similar to FIG. 2, but showing a bearing ring and seal rings disposed about the valve seat in accordance with alternative embodiments of the invention.

Figure 1:
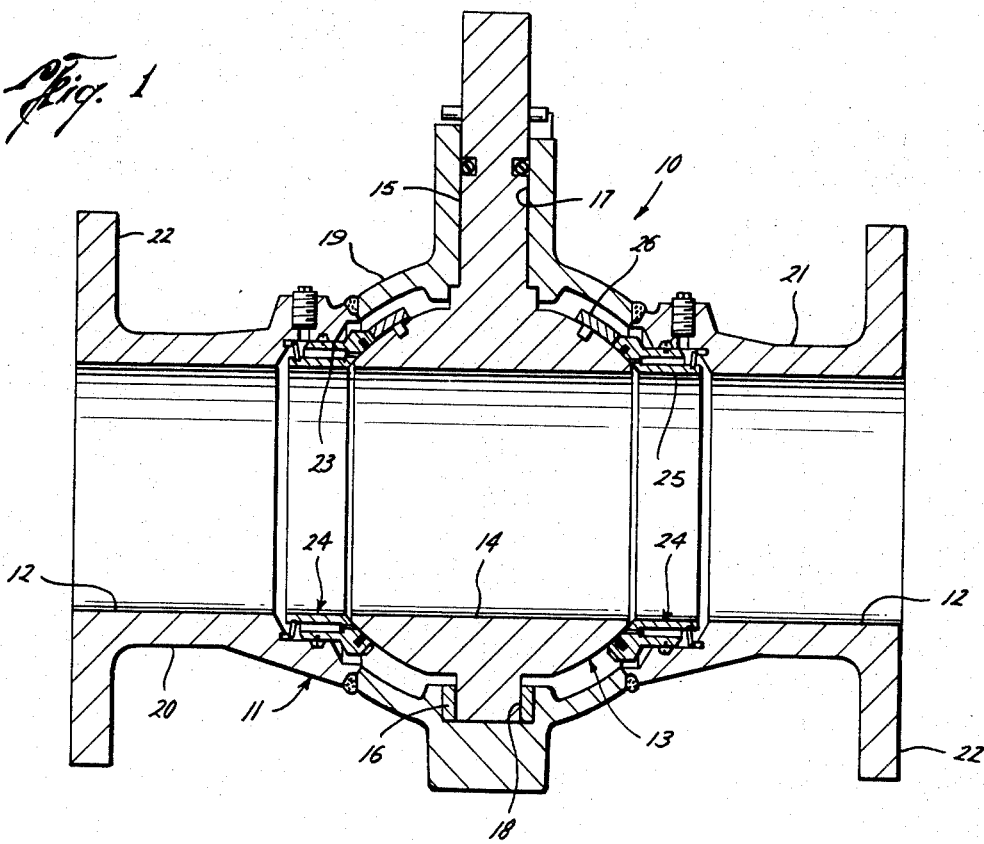
FIG. 1 is a longitudinal sectional view of a valve having its seats mounted for sealably sliding within its flowway in accordance with one embodiment of the present invention.
Figure 2:
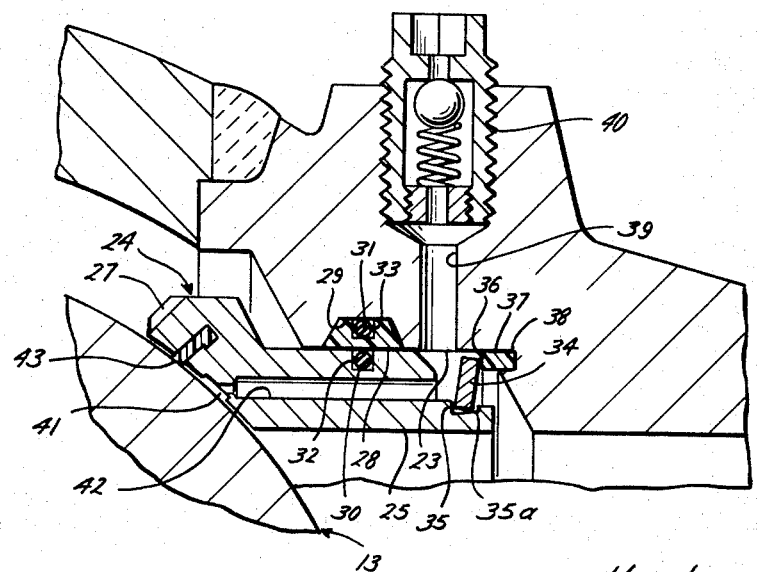
FIG. 2 is an enlarged sectional view of a part of the valve of FIG. 1, showing in detail the manner in which the bearing ring and seal rings are disposed about the seat.

With reference now to the details of the above-described drawings, the valve shown in FIG. 1, and designated in its entirety by reference character 10, includes a valve body 11 having a flowway 12 therethrough and a closure member 13 movable within the body between positions opening and closing the flowway. As shown, the closure member 13 comprises a ball having a port 14 therethrough adapted to be aligned with the flowway to open same (FIG. 1) and disposed laterally thereacross to close same (FIG. 2). Thus, the ball has upper and lower, axially aligned stems 15 and 16 journaled within bearings 17 and 18, respectively, on the valve body 11 to permit it to be rotated 90° between its opened and closed positions. The upper stem extends through the bearing 17 and has an outer end to which a suitable operator may be connected for rotating the closure member in the manner described.

The valve body is made up of an enlarged central portion 19 closely surrounding the closure member 13 and tubular extensions 20 and 21 welded to the opposite open sides of the central portion 19 to provide the inlet and outlet portions of the flowway 12. Flanges 22 on the outer ends of the tubular extensions 20 and 21 provide means by which the valve body may be connected in a flowline.

A valve seat 24 is received within the flowway on each side of the closure member 13 so as to engage said one side at its inner end. More particularly, each seat is received within an annular recess 23 of the flowway near the intersection of each tubular extension with the enlarged central portion 19. Each seat has a central opening 25 which provides an axial continuation of the port 14 through the closure member and the inlet and outlet portions of the flowway 12.

As described in aforementioned U.S. Pat. No. 3,157,190, the central portion 19 of the valve body may be split along a plane passing through the axis of the flowway and perpendicular to the axis of rotation of the closure member. During assembly of the valve, the bearings of the split portions are fitted over the stems 15 and 16 of the ball closure and edges of the split portions welded to one another to capture the closure member. The seats 24 may then be assembled within the recesses 23, and the inner end edges of the tubular extensions welded to the edges of the opposite open sides of the body portion 19 so as to capture the seats within the valve body engaging the closure member.

The valve 10 also includes a means for rotating each seat 24 about its axis so as to distribute wear about the seat. Thus, as indicated in FIG. 1, a dog 26 is carried on each upper side of the closure member 13 for engaging with and disengaging from teeth 27 (FIG. 2) about the periphery of the seat as the closure member is rotated between opened and closed positions. A detailed description of the construction and operation of these parts for rotating the seat during operation of the valve can be found in the aforementioned U.S. Pat. No. 3,157,190.

The outer side of each valve seat 24 is cylindrical and fits closely within the cylindrical outer surface of the recess 23 so as to permit the seat to move axially as well as rotationally within the recess. As best shown in FIG. 2, a ring 28 of polytetrafluoroethylene or other material having similar low friction characteristics is disposed between the outer side of the seat and the recess 23 of the flowway. More particularly, the inner and outer surfaces of the ring 28 are cylindrical so as to conform with the outer side of the seat and the cylindrical surface of the recess 23, respectively, and the ring is of such thickness that it will prevent the outer side of the seat from engaging the recess tightly, and, in fact, may actually prevent the seat from contacting the recess.

Consequently, the ring 28 provides a bearing between the seat and valve body which supports the radial loads to which the seat is subjected during normal operation of the valve. As previously described, due to the low friction characteristic of the material from which the ring 28 is formed, there is a minimum resistance to sliding of the seat within the flowway recess, either in an axial direction or rotationally.

In the embodiment of the invention illustrated in FIGS. 1 and 2, the bearing ring 28 is received within a groove 29 formed in the recess 23, and thus with its opposite ends between oppositely facing end walls or shoulders of the valve body. As shown, the opposite end walls of the groove taper radially inwardly and outwardly to cause the bearing ring to be wedged into the body under radial bearing loads.

In order to seal the seat with respect to the vale body, a first rubber O-ring 30 is disposed between the conforming surfaces of the bearing ring 28 and seat 24, and a second rubber O-ring 31 is disposed between the conforming surfaces of the bearing ring and the recess 23 of the valve body flowway. More particularly, and as shown in FIG. 2, the seal ring 30 is received within a groove 32 formed in the outer side of the seat, and the seal ring 31 is received within a groove 33 formed in the outer side of the bearing ring 28. The diameters of these seal rings are slightly greater than the depth of the grooves in which they are received so that each forms an interference seal with the bearing ring and the oppositely facing conforming surface of either the valve seat or the valve body flowway. Although this sealing engagement between the O-rings and the seat and valve body provides some frictional resistance to sliding of the seat with respect to the valve body, such resistance is very small inasmuch as the O-rings will slide over the bearing ring, rather than the metal seat or valve body.

As also shown in FIG. 2, the inner end of each seat is urged yieldably against the adjacent side of the closure member 13 by means of a washer type spring 34. Thus, as shown, the radially inner edge of the spring engages an outwardly facing surface 35 on the inner side of the groove 35a about the outer side of the seat, and the radially outer edge of the spring engages an inwardly facing surface 36 on the outer end of the recess 23 of the flowway. As shown, the groove 35a is formed in a radially reduced outer end portion of the seat.

Since the spring is tightly engaged at its inner and outer edges with the eat and valve body, respectively, it would ordinarily induce considerable frictional resistance to rotation of the seat about its axis. However, in accordance with the present invention, at least one of the surfaces against which the spring is engaged is formed of a low friction material, such as polytetrafluoroethylene, so as to reduce the drag on the seat and thus reduce further the force required to rotate it about its axis. In each embodiment of the invention illustrated in the drawings, this is the surface 36 on the valve body which is engaged by the outer edge of the spring 34. As shown, the surface is on a ring 37 of the low friction material which is held within a recess 38 in the outer corner of the recess 23.

In the illustrated embodiment of the invention, the washer type spring 34 not only urges the inner end of the seat against the closure member, but also cooperates with bearing ring 28 and seal rings 30 and 31 to isolate a chamber between the seat and flowway 23 into which lubricant may be injected through a passageway 39 connecting with a suitable lubricant fitting 40 mounted in the valve body. Lubricant so injected into the chamber is caused to flow into an annular groove 41 about the inner end of the seat through passageways 42 connecting the chamber with the groove. As well known in the art, the lubricant forms a film between groove 41 and the oppositely facing surface of closure member 13 so as to enhance sealing therebetween. A seal ring 43 is carried about the inner end of the seat radially outwardly of groove 41 so as to confine the lubricant against leakage past the inner end of the seat in a radially outward direction. In the event the pressure of the lubricant exceeds a predetermined value, spring 34 will yield and seat 24 will move axially away from the closure member to permit such excess pressure to be relieved through groove 41.

The embodiment of the invention illustrated in FIG. 2A differs from that illustrated in FIGS. 1 and 2 in that the bearing ring 44 of polytetrafluoroethylene or like material disposed between the outer side of the seat 24a and the recess 23A is rectangular in cross section and confined at its opposite ends between oppositely facing shoulders on the seat and valve body. Thus, an intermediate portion of the seat is radially reduced to provide an outwardly facing shoulder 45, and an intermediate portion of the recess 23 is radially enlarged to provide an inwardly facing shoulder 46, and the shoulders are spaced axially apart a distance somewhat greater than the length of the bearing ring, when the seat is engaged with the closure member. This small space permits some axial movement of the seat away from the closure member, for purposes previously described. The ring 44 is also of a thickness somewhat greater than the radial extent of each of the shoulders 45 and 46 so that, similarly to the bearing ring 28 of FIG. 2, it reduces metal-to-metal contact between the seat and flowway.

A first rubber O-ring 47 is received within a groove 48 about the intermediate radially reduced portion of the seat for sealing between the bearing ring and the valve seat, and a second rubber O-ring 49 is received within a groove 50 about the radially enlarged portion of the recess 23a for sealing between the bearing ring and the flowway. Each O-ring forms an interference seal with the bottom of its groove and the oppositely facing metal surface of the seat or valve body. Sliding contact during sliding of the seat within the recess is thus between the bearing ring and either or both of the seal rings, and, in any event, not between the O-rings and metal surfaces.

In the embodiment of the invention illustrated in FIG. 2B, a polytetrafluoroethylene bearing ring 51 is, similarly to bearing ring 28 of FIGS. 1 and 2, received within a groove within the recess. However, as distinguished from bearing ring 28, bearing ring 51 is comprised of outer and inner tubular parts 51a and 51b, with the inner part being longer than the outer, and the groove being stepped to receive the outer part 51a in its outer portion and inner part 51b in its inner portion.

A first rubber O-ring 52 is received within a groove 53 about the outer side of the seat for sealably engaging between the seat and bearing ring 51, and, in this respect, the embodiment of the invention of FIG. 2B is similar to that of FIGS. 1 and 2. However, a second rubber O-ring 54 is received within the outer portion of the groove between the end of bearing ring part 51a and the end of the groove. The O-ring 52 is of a diameter somewhat greater than the depth of groove 53, and O-ring 54 is of a diameter somewhat greater than the depth of the outer part of the groove in the valve body. As in the case of the previously described embodiments, sliding contact of the O-rings is with the bearing ring rather than the metal surface of the seat and valve body. In the embodiment shown in FIG. 2C, a polytetrafluoroethylene bearing ring 56 is also received within a groove 57 within recess 23C of the valve body flowway. As in the case of bearing ring 44, ring 56 is rectangular in cross section of a thickness sufficient to reduce metal-to-metal contact between the outer side of the seat and the valve body recess. Still further, as in the previously described embodiments of the invention, a first rubber O-ring 58 is received within a groove about the outer side of the seat for sealing between the bearing ring and the seat.

Bearing ring 56 is shorter than the width of groove 57 to receive a second rubber O-ring 59 between its right-hand end and the right-hand end of groove 57. This O-ring is somewhat greater in diameter than the space between the right-hand end of the bearing ring and the right-hand end of groove 57 so that it forms an interference seal with each. Here again, the only relative sliding of the O-rings is over a bearing ring surface.

The embodiment of the invention illustrated in FIG. 2D is very similar to that of FIG. 2C in that it includes a polytetrafluoroethylene bearing ring 60 which is rectangular in cross section and received within a groove 61 in the valve body recess. Also, a first rubber O-ring 62 is disposed within a groove 63 about the outer side of seat 24D for sealing between the seat and bearing ring 60. Still further, bearing ring 60 is of a thickness which reduces metal-to-metal contact between the oppositely facing surfaces of the outer side of the seat and body flowway 23D. However, as distinguished from the embodiment of the invention illustrated in FIG. 2C, a second rubber O-ring 64 is received within a groove 65 about the right-hand end of the bearing ring 60 to form an interference seal with the bearing ring and right-hand end of groove 61. As in prior embodiments, the O-rings slide over only the bearing ring.

The embodiment of the invention illustrated in FIG. 2E is similar to the embodiment of FIG. 2B, in that it includes a polytetrafluoroethylene bearing ring 66 made up of two annular, telescopically arranged parts 66a and 66b. The outer part 66a is received within a groove 67 in flowway recess 23E, and inner part 66b is received within a groove 68 about the outer side of seat 24E. As shown, the grooves are so located longitudinally of one another that bearing ring parts 66a and 66b overlap longitudinally. The bearing ring parts are of a combined thickness which reduces metal-to-metal contact between the outer side of the seat and the flowway recess.

Each bearing ring part is shorter than the width of the groove in which it is received so as to provide a space between the end of the bearing ring part and an end of the groove. A first rubber O-ring 69 is received in the space between the left end of bearing ring part 66b and the left end of groove 68, and a second rubber O-ring 70 is received between the right end of bearing ring part 66a and the right end of groove 67. More particularly, O-rings 70 form an interference seal with the valve body and bearing ring part 66b, and O-ring 69 forms an interference seal with the seat and bearing ring part 66a. As in the other embodiments, the sliding contact of the O-rings is only with the bearing parts.

From the foregoing it will be understood that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a closure member within the valve body for opening and closing the flowway, an annular seat mounted within the flowway for engaging at one end with one side of the closure member, a bearing ring disposed between the seat and flowway and having annular surfaces on its inner and outer sides fitting closely against conforming surfaces on the seat and the flowway, respectively, a first ring sealing between the conforming annular surfaces on the bearing ring and flowway, and a second ring sealing between the conforming annular surfaces on the bearing ring and seat, said bearing ring being formed of polytetrafluoroethylene or other material having low friction characteristics; and said sealing rings being formed of rubber or other readily deformable elastomeric material.

2. A valve of the character defined in claim 1, wherein the opposite ends of said bearing ring are disposed between oppositely facing shoulders on the valve body.

3. A valve of the character defined in claim 1, wherein the opposite ends of said bearing ring are disposed between oppositely facing shoulders on the valve body and seat.

4. A valve of the character defined in claim 1, wherein the opposite ends of said bearing ring are disposed oppositely facing shoulders on the seat.

5. A valve of the character defined in claim 1, wherein said first seal ring is within a groove between the seat and the flowway.

6. A valve of the character defined in claim 1, wherein said first seal ring engages an end surface of the bearing ring and an oppositely facing surface of the valve body.

7. A valve of the character defined in claim 1, including a washer type spring having its inner and outer edges engaged with oppositely facing surfaces of the seat and valve body to urge the inner end of the seat against the closure member, at least one of the surfaces engaged by the spring being formed of polytetrafluoroethylene or other material having low friction characteristics.

8. A valve of the character defined in claim 7, wherein said one surface is on a ring of said material carried within a groove of the valve body.

* * * * *